Nov. 2, 1965
J. O. MELTON ETAL
3,216,019
OPERATIONS RECORDER
Filed Feb. 20, 1963
6 Sheets-Sheet 1
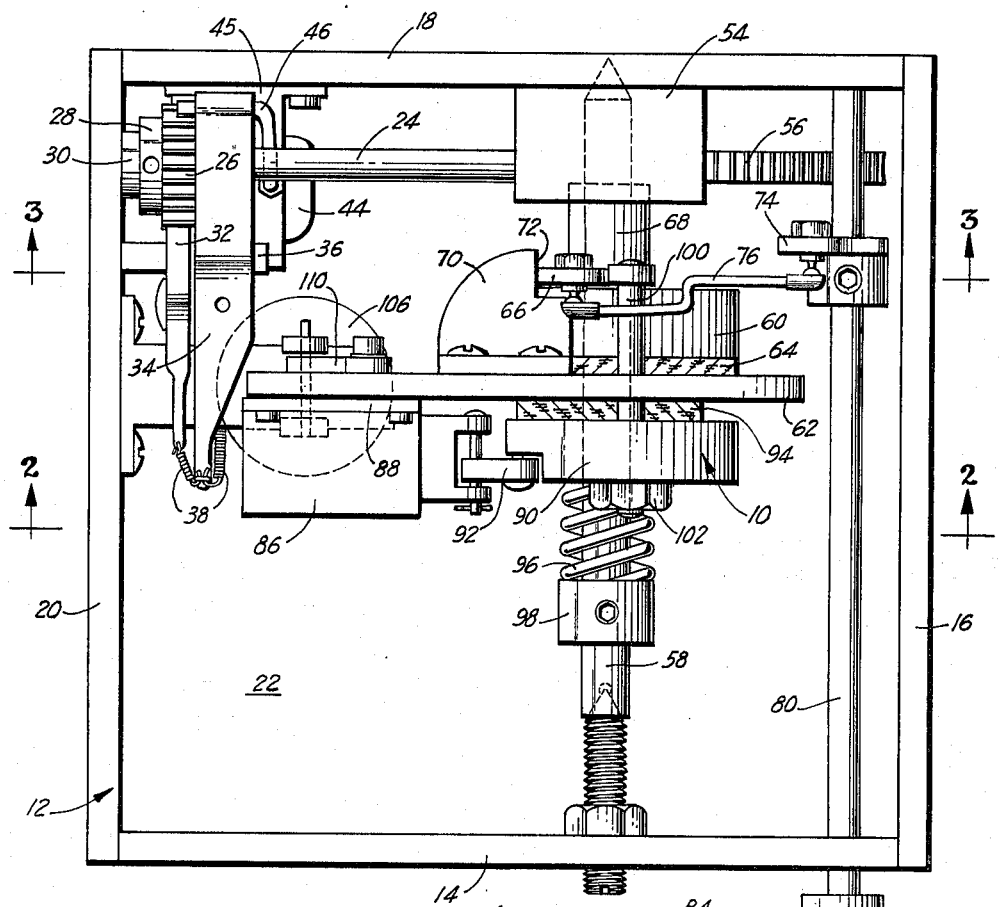
Fig. 1
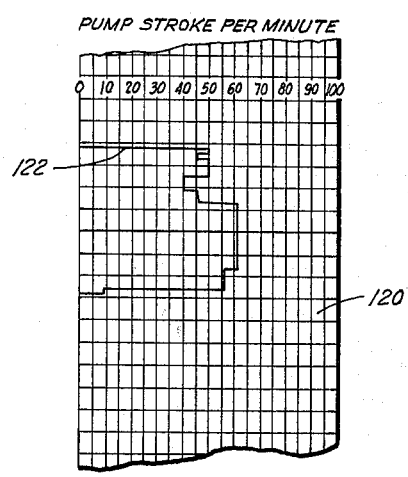
Fig. 6
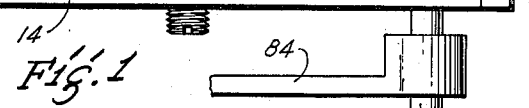
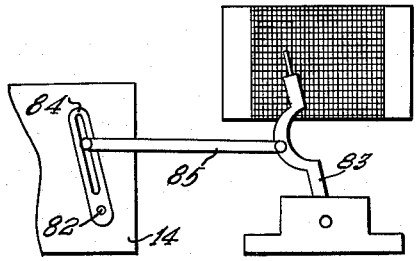
Fig. 11
INVENTORS
James O. Melton &
Irvin M. Carpenter
BY William S. Dorman
ATTORNEY

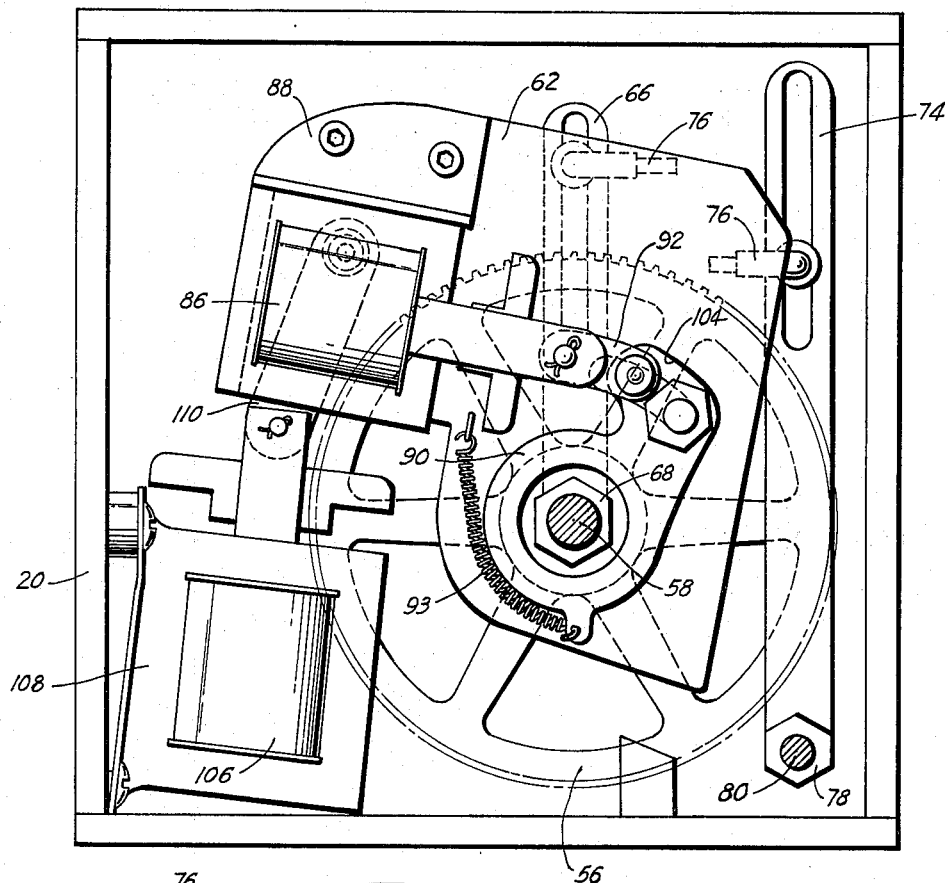
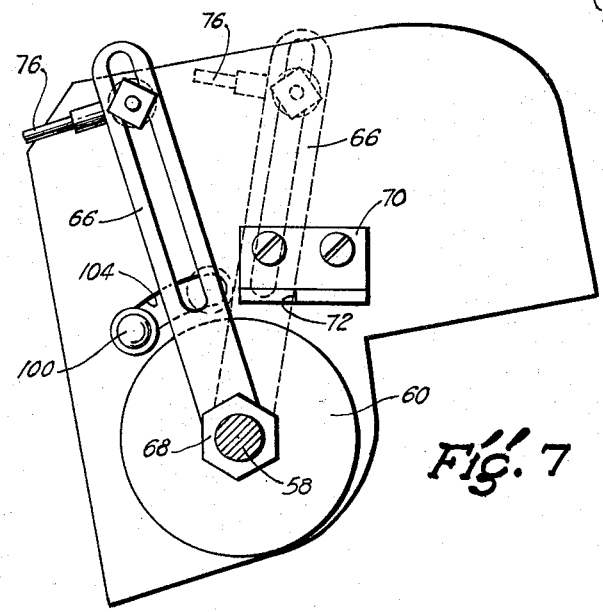
Fig. 2
Fig. 7
INVENTOR.
James O. Melton &
Irvin M. Carpenter
BY
William S. Dorman
ATTORNEY Nov. 2, 1965

J. O. MELTON ETAL 3,216,019

OPERATIONS RECORDER

Filed Feb. 20, 1963

INVENTOR.
James O. Melton &
Irvin M. Carpenter

BY William S. Dorman

ATTORNEY

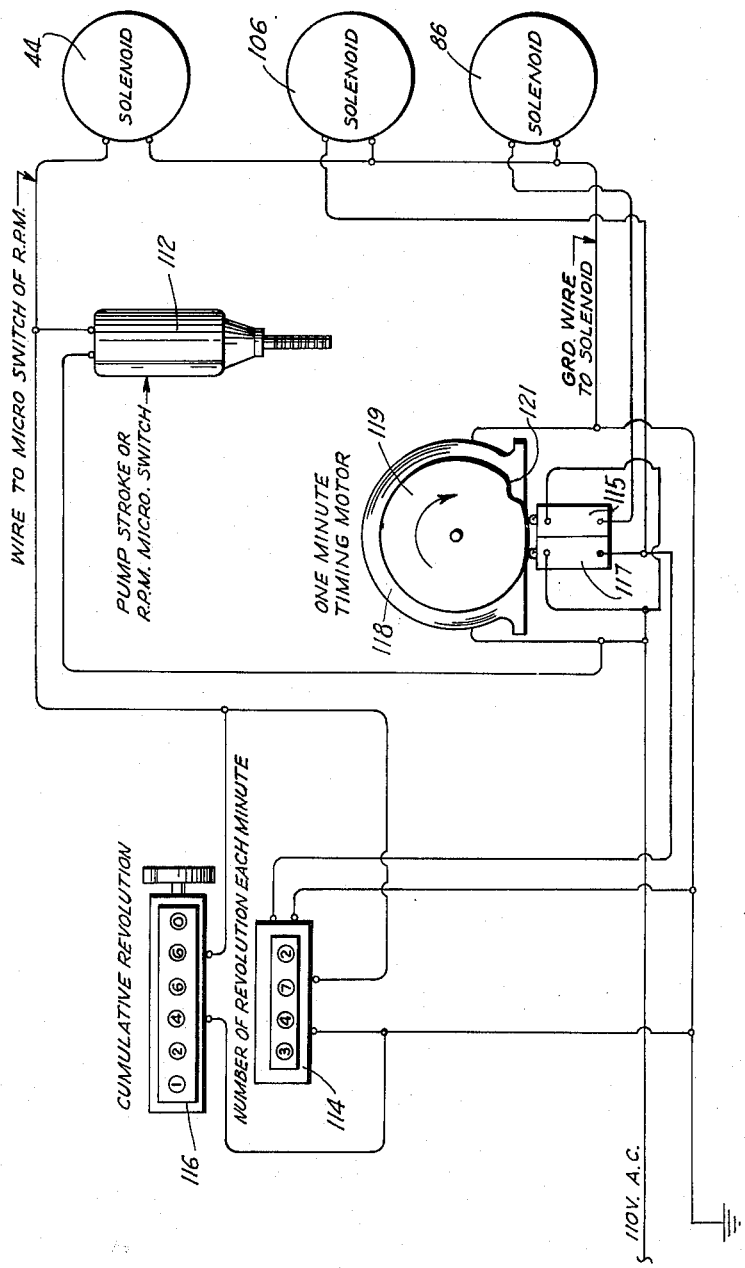

Nov. 2, 1965   J. O. MELTON ETAL   3,216,019
OPERATIONS RECORDER
Filed Feb. 20, 1963   6 Sheets-Sheet 5

INVENTORS
James O. Melton &
Irvin M. Carpenter
BY
William S. Porman
ATTORNEY

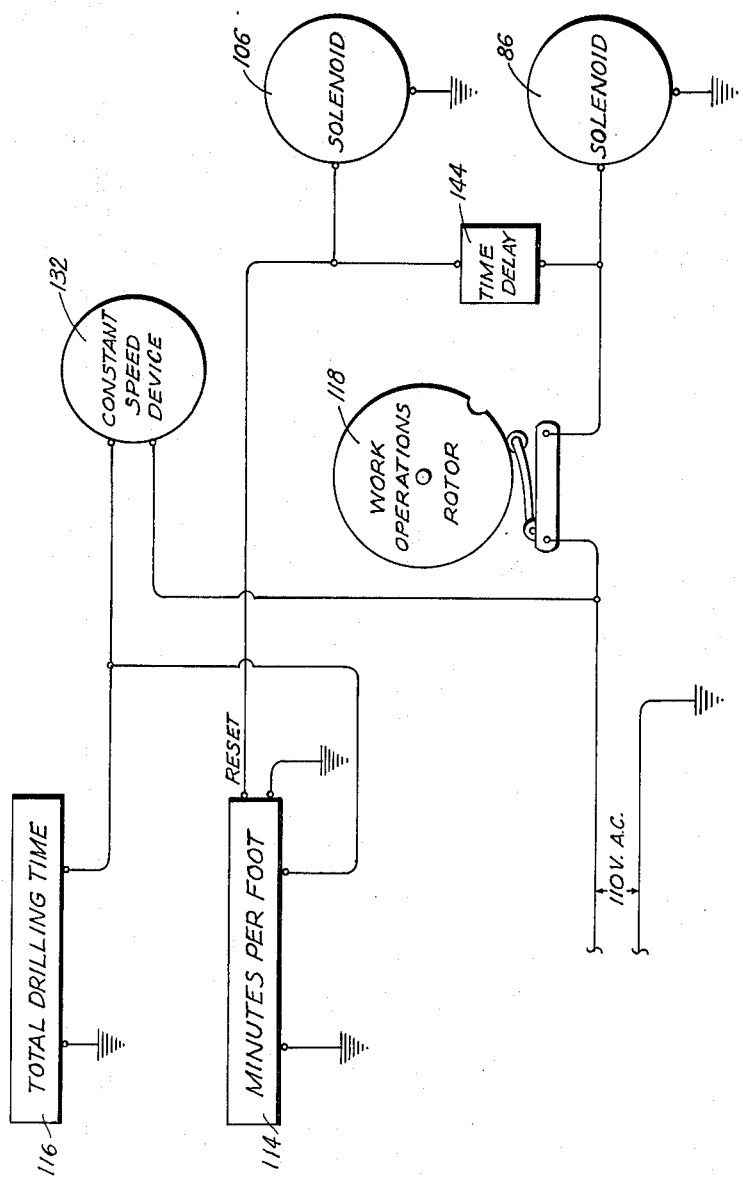

United States Patent Office 3,216,019
Patented Nov. 2, 1965

3,216,019
OPERATIONS RECORDER
James O. Melton, Norman, and Irvin M. Carpenter, Oklahoma City, Okla., assignors to The Geolograph Company, Oklahoma City, Okla., a corporation of Oklahoma
Filed Feb. 20, 1963, Ser. No. 259,820
12 Claims. (Cl. 346—30)

This invention relates to improvements in recording apparatus and more particularly, but not by way of limitation, to a combined counting and recording device of the electromechanical type designed and constructed for providing a single, continuous trace on a recording data sheet.

It is frequently desirable to record many operational procedures to provide a graphic representation of a particular work operation. This type of record is particularly desirable in well drilling operations, and the like, wherein it is necessary or important to correlate a given frequency of occurrence of an operation with related data, such as elapsed time, or distance, or other known factors. There are many recording devices available today for providing a pictorial or graphic representation of this type of data. One commonly used type of recording equipment utilizes a recording stylus or pen operable for marking a trace on an appropriate web or sheet of paper. The most frequently utilized recorder apparatus for this type of recording process utilizes a marking stylus having a reference or initial position whereby the stylus is moved transversely across the chart or sheet to the position thereon representing the count being recorded, and is subsequently reversed in direction to return to the initial or reference position at each time period between the actual count indication operation. This results in a trace or graphic inscription on the chart which comprises a series of jagged looking markings on the chart, or a line extending across the chart during each time interval, or distance measurement interval, or the like. The recorded count data is usually indicated by the extreme limit of the movement of the stylus in one direction, and must be ascertained by a visual inspection of a relatively sharp trace or point indicated on the graph as achieved by the termination of the movement of the stylus in one direction and reversal thereof for the return to the reference position. Thus, only one point is indicated on the chart for each work operation count recorded thereon.

The present invention contemplates a novel recorder apparatus of the electromechanical type particularly designed and constructed for providing a single, continuous trace on a recording data sheet in lieu of the series of transversely extending lines which are usually drawn or inscribed across the sheet with presently available equipment of this type. One embodiment of the invention provides a combination counting and recording apparatus adapted for actuation upon the occurrence of a work operation, such as the stroke of a pumping apparatus, or the revolution of a rotary table, or the like, for counting such occurrences. This device combines a continually moving chart with an intermittently movable recording pen to provide a visual recording of the mounted work operations as correlated with dimensional data, such as time or distance, and also provides a visual record of the accumulation of such countings through the complete elapsed interval of the counting operation. Another embodiment of the invention functions in substantially the opposite manner from the first embodiment and contemplates a constant speed device for driving or transmitting continuous motion to a recording pen for inscribing the trace on a chart which is advanced intermittently in accordance with dimensional data, such as footage drilled, or an events occurrence, or the like.

In an apparatus of the type set forth in first mentioned embodiment wherein the occurrences of a work operation are counted and recorded on a constantly moving or advancing recording data sheet, a gear system is operated upon each counting of the work operation for positioning an extension member or shaft which engages a lever mechanism for moving a marking pen or stylus along the advancing graph or chart to the position thereon corresponding to the number of occurrences thus counted. A timing mechanism is provided for energization at predetermined intervals, such as time periods of one minute duration, whereby a second shaft is periodically moved in accordance with the preselected time interval for engaging the lever mechanism with the first shaft. Subsequent to the engagement of the lever mechanism with the first shaft for assuring an accurate positioning of the marking pen with respect to the chart, a second circuit of the timing device is actuated for resetting the pen carriage assembly to a reference or initial position without movement of the pen or stylus from the previous setting on the chart. The apparatus is then in position for continuing the process of counting and recording the work operation. This results in a single trace along the graph paper, which may be stepwise depending upon the results of the counting operation, but the pen or stylus does not move to the reference point between the indications of the counting operation. This results in a continuous longitudinally extending line on the graph paper for indicating the count results rather than a sharp pointed type of indication, thus greatly facilitating the computation of the recorded data.

In an apparatus of the type set forth in the second mentioned embodiment, a gear system is continuously driven for transmitting motion to a recording pen for moving the pen across a record data sheet which is advanced at intermittent intervals, such as upon the completion of the drilling of one foot in a well drilling operation, or other work occurrence. The gear system is actuated in accordance with a continuous dimensional function, such as time, and upon the occurrence of a work event, such as the drilling of a given footage of well bore, the recording mechanism is actuated for establishing the position of the pen with respect to the chart in accordance with the elapsed time as the chart is advanced to indicate the work or events occurrence. Thus, a visual record is provided of the elapsed time for an events occurrence. The counting or indicating mechanism is then returned to a reference position, and the recording of the continuous dimensional function during the next succeeding work occurrence interval is repeated for providing a single trace on the graph which may be of a similar appearance to that hereinbefore set forth. In either embodiment of the invention, the jagged looking markings, or lengthy lines extending across the chart are substantially eliminated, and a visual recording is provided which greatly facilitates the computation of the data indicated thereby.

It is an important object of this invention to provide a novel recording apparatus for producing a single, continuous trace on a recording data sheet.

It is another object of this invention to provide a novel recording apparatus of the type set forth above wherein returning of the marking pen to a reference or initial position is substantially eliminated during the recording operation.

Another object of this invention is to provide a novel recording apparatus of the electromechanical type wherein operational data is recorded in a manner greatly facilitating the computation thereof.

Still another object of this invention is to provide a novel combined counting and recording apparatus of the electromechanical type wherein a visual record of events occurrences is correlated with dimensional data in a single continuous trace.

A still further object of this invention is to provide a novel recording apparatus of the type hereinbefore set forth which is simple and efficient in operation and economical and durable in construction.

Other and further objects and advantageous features of the present invention will hereinafter more fully appear in connection with a detailed description of the drawings in which:

FIGURE 1 is a plan view of a combination counting and recording apparatus embodying the invention with a portion of the outer housing removed for purposes of illustration.

FIGURE 2 is a sectional elevational view taken on line 2—2 of FIGURE 1 with portions depicted in dotted lines for purposes of illustration.

FIGURE 5 is a schematic diagram of the electric circuit for the apparatus according to the invention.

FIGURE 6 is a plan view of a portion of a representative graph such as may be produced through use of the invention.

FIGURE 7 is an elevational view of the reset plate member and lever member with portions depicted in dotted lines for purposes of illustration.

FIGURE 10 is a view similar to FIGURE 5 depicting the modified form of the invention.

FIGURE 11 is a diagrammatic sketch showing a linkage connection between the external lever and a suitable recording pen.

Figure 3:
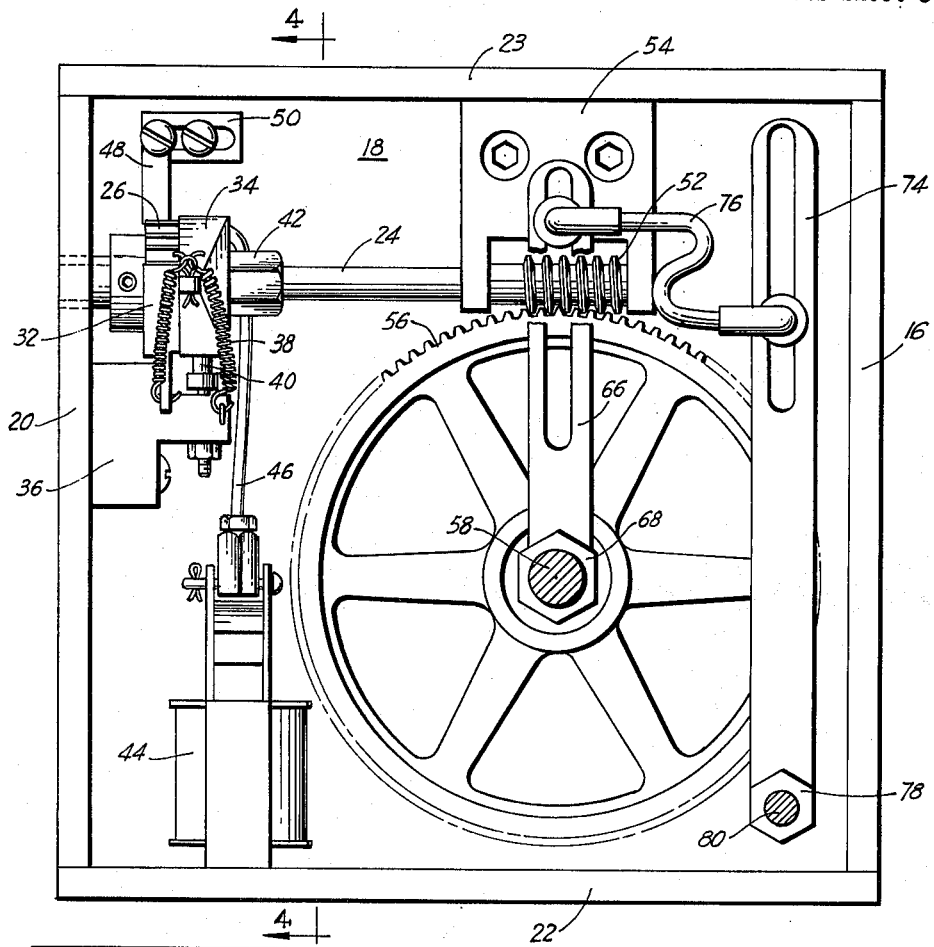
FIGURE 3 is a sectional elevational view taken on line 3—3 of FIGURE 1.
Figure 4:
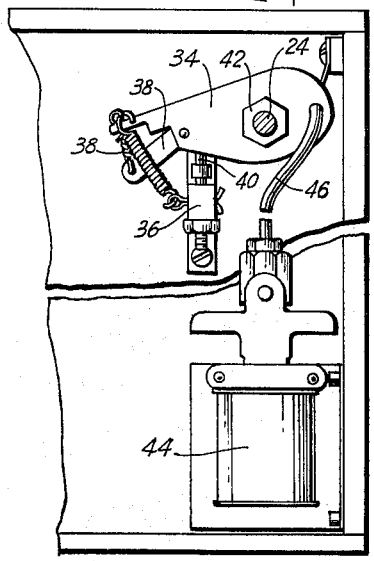
FIGURE 4 is a broken sectional view taken on line 4—4 of FIGURE 3.

Referring to the drawings in detail, reference character 10 generally indicates a recorder apparatus preferably contained within a suitable outer housing 12 comprising four upstanding sidewalls 14, 16, 18 and 20, removably secured in any suitable manner (not shown) to a bottom plate 22 and a top plate 23. A shaft 24 is suitably journaled in the sidewall 20 and extends substantially perpendicularly therefrom, as clearly shown in FIGURES 1 and 3. A ratchet member 26 is disposed on the shaft in the proximity of the sidewall 20 and may be keyed or otherwise suitably secured thereto for simultaneous rotation therewith. A collar 28 is preferably disposed on the shaft for retaining the ratchet 26 securely in longitudinal position thereon and may be interposed between the ratchet 26 and a sleeve or bushing 30, which supports the shaft in the sidewall 20.

A pawl member 32 is arranged for engagement with the ratchet 26 and is carried by a lever arm 34 which is freely journaled on the shaft 24 adjacent the ratchet 26 and oppositely disposed from the collar 28. The lever 34 and pawl 32 are connected with an inwardly extending stop member 36 by suitable spring means 38 whereby the lever 34 normally rests on a suitable stud member 40 carried by the stop 36. The stud member 40 is adjustably secured to the stop member 36 in any suitable manner and the stop member 36 is preferably secured to the inner wall of the side plate 20. A set collar 42 is preferably provided on the shaft 24 adjacent the lever 34 for securely retaining the lever in longitudinal position on the shaft 24. The collar 42 is eliminated in FIGURE 1 for purposes of illustration.

A solenoid 44 is suitably mounted on the plate 18 by a mounting bracket 45, or the like, and disposed in the general vicinity of the lever arm 34 and pawl and ratchet members 32 and 26, respectively. The solenoid 44 is secured to the lever 34 by a suitable shaft or link member 46 whereby upon energization of the solenoid 44 the plunger or shaft 46 will be moved downwardly, as viewed in FIGURE 3, for rotating the lever 34 about the shaft 24 in one direction against the action of the spring means 38. The action of the spring means 38 returns the lever 34 to the normal rest position on the stud 40 when the solenoid 44 is deenergized.

The lever 34 is rotated in the direction against the action of the spring means 38 through a predetermined angle upon energization of the solenoid 44. The stud 40 is adjustable in order that the angle through which the lever 34 is rotated may be selected in accordance with the particular scale or graphic representation desired upon operation of the apparatus 10, as will be hereinafter set forth. The pawl 32 is moved simultaneously with the lever 34 and, being in engagement with the ratchet 26, transmits rotation to the ratchet simultaneously with the lever 34, thus rotating the shaft 24. A stop arm 48 is secured to the sidewall 18 in any suitable manner such as the bracket 50 and engages the ratchet 26 for precluding a reverse rotation thereof subsequent to the rotation by the pawl 32. Thus, each time that the solenoid 44 is energized the lever 34 is rotated through the preselected or predetermined angle for transmitting a synchronized rotation to the shaft 24 through the pawl 32 and cooperating ratchet 26.

A worm 52 is provided on the outer extremity of the shaft 24 and the shaft and worm are supported from the side plate 18 by a suitable support bracket 54. A complementary gear 56 is arranged for engagement with the worm 52 for rotation thereby, as is well known. The worm gear 56 is mounted on a shaft 58 which is journaled between the side plates 14 and 18 in any well known manner and is keyed or otherwise secured thereto. The shaft 58 is disposed substantially perpendicular to the shaft 24 and rotation of the worm 52 by the shaft 24 is transmitted to the shaft 58 by the worm gear 56. A disc 60 (FIGURE 1) is mounted on the shaft 58 for rotation simultaneously therewith and is spaced from the worm gear 56. A carrier plate 62 is loosely arranged on the shaft 58 and is engaged by the disc 60 through a friction disc member 64 whereby rotation is transmitted from the disc 60 to the plate 62.

A first lever member 66 extends radially outward from a sleeve 68 which is loosely mounted on the shaft 58 between the worm gear 56 and disc 60. An extension plate or bracket 70 is rigidly secured to one face of the plate 62 and extends outwardly substantially perpendicularly therefrom in a direction toward the lever 66. The extension member 70 may be of any suitable configuration and as depicted herein is provided with a shoulder 72 adapted for engagement with the lever 66 for a purpose as will be hereinafter set forth.

The first lever 66 is connected with a second lever 74 through any suitable linkage, such as shown at 76, for transferring movement therebetween. The second lever 74 extends radially outward from a collar 78 which is rigidly secured around a shaft 80 in any suitable manner (not shown). The shaft 80 is journaled between the sidewalls 14 and 18 and is preferably spaced from the shaft 58 and disposed substantially parallel thereto. One end 82 of the shaft 80 extends outwardly from the plate 14 for receiving a third lever member 84 thereon. The lever member 84 is rigidly secured to the end 82 of the shaft 80 in any suitable manner (not shown) and in turn is connected with a marking pen or recording stylus 83, as shown in FIG. 11, through any suitable linkage mechanism, such as linkage member 85, as is well known. It will be apparent that any movement or rotation of the first lever 66 will be transmitted to the second lever 74 through the linkage member 76 and to the third lever 84 through the shaft 80 for conducting movement to the recording pen in accordance with counted work operations for a purpose as will be more fully set forth hereinafter.

A second solenoid 86 is secured to the carrier plate 62 in any suitable manner, such as by the bracket 88, and is disposed on the opposite face of the plate 62 with respect to the bracket 70. The solenoid 86 is connected with an arm 90 through any suitable linkage means 92. The arm 90 is freely journaled on the shaft 58 in any suitable manner (not shown) for independent rotation with respect thereto upon energization of the solenoid 86. A spring member 93 is anchored between the arm 90 and the plate 62 for constantly urging the arm 90 in a clockwise direction, as viewed in FIGURE 2, and away from the solenoid 86. The arm 90 is spaced slightly from the plate 62 and a suitable friction disc 94 is interposed therebetween for transmitting movement from the disc 62 to the arm 90 during operation of the apparatus 10. A spring member 96 is disposed around the shaft 58 and has one end anchored at a set collar 98 and the opposite end anchored adjacent a suitable bearing (not shown) for retaining the friction member 94 and arm 90 securely in position on the shaft 98.

A shaft member 100 is secured to the arm 90 in any suitable manner, such as by the nut 102 and extends perpendicularly therefrom through an arcuate slot 104 (FIGURE 7) provided in the carrier plate 62. The shaft 100 extends through the plate 62 in a direction toward the first lever 66 and is adapted for engagement therewith to move the lever 66 into engagement with the shoulder 72 during certain operations of the apparatus 10. The spring 93 maintains the shaft 100 in a normal position adjacent the left end of the shaft 104 as shown in solid lines in FIGURE 7.

A third solenoid 106 is mounted on the sidewall 20 in any suitable manner, such as the bracket 108 and is connected with the carrier plate 62 by a link arm member 110 whereby the carrier plate will be rotated about the shaft 58 in one direction upon energization of the solenoid 106 for returning the carrier plate to an initial or reference position. The action of the solenoid 106 provides sufficient force to overcome the frictional engagement of the disc 64. It will be apparent that although the arm member 90 may be moved freely with respect to the plate 62 upon energization of the solenoid 86, the engagement between the slot 104 and the shaft 100 will cause the arm 90 to move simultaneously with the plate 62 in one direction of rotation thereof. This particular direction of rotation for the plate 62 results from energization of the solenoid 106. The friction means 94 between the plate 62 and arm 90 transmits rotation from the plate 62 to the arm 90 during an opposite rotation of the plate 62, and rotation of the plate 62 in the said opposite direction is caused by rotation of the gear 56 and frictional engagement with the members 64 and 60, as hereinbefore set forth.

Referring now to FIGURE 5, a schematic electrical diagram is depicted, such as may be utilized in one type of installation for the apparatus 10. A micro switch 112 may be suitably connected for actuation upon the occurrence of a work operation which is desired to be counted and recorded, such as a pump stroke or a revolution of a rotary table, or the like. The micro switch 112 is operably connected to a suitable counter device 114 and cumulative counter device 116 and to the solenoid 44 whereby the solenoid 44 is energized each time the work operation occurs. A timing device or motor 118 is operably connected through two separate circuits to the solenoids 86 and 106 whereby the solenoid 86 is energized intermittently for movement of the arm 90 at preselected or predetermined time intervals, such as one minute, but not limited thereto, and the solenoid 106 is separately energized for resetting or moving the carrier plate 62 to the initial or reference position subsequent to the actuation of the solenoid 86.

The cumulative counter 116 is so designed and arranged to provide a visual indication of the accumulated number of work occurrences which have occurred from the beginning of the counting operation whereas the counter device 114 provides a visual indication of the number of work occurrences during the particular dimensional function, such as a time period of one minute, or the like. Of course, the information indicated by the counter 114 is recorded by the trace 122 on the chart 120, but the visual showing provided by the counter 114 may provide a ready check for the recording instrument to quickly ascertain if proper dimensional or scale settings have been selected for the recording pen as correlated to the chart 120. The cumulative counter 116 provides a constantly available indication of the total number of work operation or events occurrences, and although this information may be obtained by a summation of the readings shown by the trace 122, it is a matter of convenience to provide the total counting at all times during the operation of the recorder 10.

As schematically shown in FIGURE 5, the solenoids 86 and 106 may be energized by suitable micro-switches 115 and 117, respectively. The timing device or timing motor 118 may be provided with a constantly rotating cam member 119 having a detent 121 provided in the outer periphery thereof. As the detent 121 is moved into alignment with the first switch 115, the switch is energized for actuation of the solenoid 86, and similarly as the detent 121 moves on into alignment with the second switch 117, the second switch is energized for actuation of the solenoid 106. Of course, this operation may be achieved in many ways, and the means schematically depicted herein is merely illustrative.

It will be apparent that whereas the present embodiment discloses the use of micro switch members, it is to be understood that the button type or any other momentary type of switch may be utilized in lieu thereof. In addition, it is to be noted that whereas the timer and solenoids depicted herein are electrical, it is anticipated that mechanical type devices may be utilized in lieu thereof. For example, air valves and air cylinders may be utilized for operation of the device to provide a similar result and the timer may include a clock having a shaft provided with suitable cam means. Furthermore, other pickup means may be utilized, such as photocells or magnetic field switches through standard circuitry to produce the result of measuring or counting the occurrences of some function or work operation.

*Operation*

When it is desired to count or record the occurrences of a work operation, such as the strokes of a pumping device or the revolutions of a turn table, rotary table, or the like, the apparatus 10 may be operably connected for actuation during the work operation. The switch 112, being actuated upon each work occurrence, causes energization of the solenoid 44 at each such occurrence whereby the lever 34 is rotated in one direction about the shaft 24. The pawl 32 engaging the ratchet 26 transmits this rotation to the shaft 24 and thus to the worm 52. Rotation of the worm 52 is translated to the shaft 58 through the worm gear 56. Rotation of the shaft 58 causes simultaneous rotation of the disc 60 for rotating the carrier plate 62 in one direction through the friction member 64.

It is to be noted that the increment of rotation of the shaft 24 upon each work operation is relatively small as determined by the adjusting means 40 and in accordance with the desired scale of the graphic representation desired.

Movement or rotation of the carrier plate 62 by the disc 60 in the said one direction brings the shoulder 72 of the bracket 70 into engagement with the first lever 66 and since the lever 66 is freely mounted on the shaft 58, the lever is moved simultaneously with the carrier plate 62 through a distance corresponding to the number of occurrences of the work operation as represented by the scale of the graphic record. The movement of the first lever 66 is transmitted to the second lever 74 through the linkage 76 and to the third lever 84 through the shaft 80 for moving of the marking pen or stylus 83 on a suitable graph paper or recording data sheet 120, as depicted in FIGURE 6. The movement of the stylus along the recording data sheet 120 produces a continuous trace 122 thereon, the details of which will be hereinafter more fully set forth.

The rotation of the worm 52 and complementary worm gear 56 and carrier plate 62 continues with each work operation being counted until the preselected time interval as established by the timer 118 has elapsed. The time interval may be substantially any desired period and for purposes of illustration may be considered herein as one minute. Upon elapse of the one minute time interval, the solenoid 86 is energized for quickly rotating the arm 90 by the linkage member 92 in a reverse direction from that of the plate 62 as moved by the gear 56. Movement of the arm 90 moves the shaft 100 in the slot 104 into engagement of the lever 66 with the shoulder 72. Of course, during the initial counting period, the shoulder 72 will be in engagement with the lever 66 during the entire counting time period, but subsequent time period intervals may result in a condition wherein the shoulder 72 is not moved through a sufficiently large arc for engaging the lever 66 as will hereinafter be set forth.

The actuation of the arm 90 and shaft 100 is substantially instantaneous in that energization of the solenoid 86 rapidly rotates the arm 90 in the reverse direction and immediately releases the pull thereon whereby the spring 93 quickly pulls the arm 90 to the normal position therefor, with respect to the plate 62. In this normal position the shaft 100 rests against the left end of the groove 104 as shown in FIGURE 7. Subsequent to the movement of the arm 90 and shaft 100, the solenoid 106 is energized and moves the plate 62 in an opposite direction of rotation from that established by the worm gear 56. The energization of the solenoid 106 moves the plate 62 rapidly back or in the reverse direction to an initial or reference position. Of course, the plate or bracket 70, solenoid 86, and arm 90 are moved simultaneously with the plate 62 but the lever 66 will remain in the position established by the counting operation prior to the energization of the solenoid 106.

The counting operation continues as hereinbefore set forth for rotating the worm 52 and worm gear 56 whereby rotation is transmitted to the carrier plate 62. During this second time interval, the bracket 70 moves from the reset or reference position and in a direction toward the prepositioned lever 66. In such instances wherein an equal or greater number of work operations occur during the second time period as during the first or previous time period, the plate 62 will move through a sufficient arc for bringing the shoulder 72 into engagement with the lever 66 and moving the lever 66 simultaneously therewith in accordance with the number of work operation occurrences. However, in the event a lesser number of functions or work operation occurrences are counted during the second time interval, the shoulder 72 will not be moved through a sufficiently great distance for engaging the lever 66, as shown in solid lines in FIGURE 7. In this instance the actuation of the arm 90 for moving the shaft 100 against the lever 66 will move the lever 66 into contact with the shoulder 72, as shown in dotted lines in FIGURE 7. This movement also is transmitted to the marking pen and appropriately records the counted number of operations on the graph 120.

Upon the elapse of each selected time interval, the solenoid 86 is energized for actuating the arm 90 and moving the lever 66 against the shoulder 72. Subsequent to the release of the arm 90, the solenoid 106 is energized for moving the carriage plate 62 to the initial or reference position and the procedure is repeated throughout the counting and recording periods.

During the counting and recording operation, the chart 120 normally advances or moves at a constant rate of speed, as is well known, while the recording pen 83 is inscribing the trace 122 thereon. During the time periods wherein the shoulder 72 is bearing against the lever 66 prior to the actuation of the arm 90, a line is inscribed across the chart 120 in accordance with the counted number of work operations as established by the scale of the chart 120. This line normally extends substantially horizontally across the chart 120, but will slope downwardly at a slight angle due to the advancing movement of the chart. At the end of each time interval when the carriage plate and associated members are returned or reset to the initial position, the pen or stylus will remain at the same relative transverse position on the chart 120 as established by the immediately preceding time period, and the next successive time period of counting begins. It may be that during several successive time periods the same number of work operations will be counted by the apparatus 10. In this event, the recorder pen will not move transversely in either direction with respect to the chart 120 and a substantially vertical trace or line will be transcribed on the chart due to the advancement of the chart.

In the event any time period results in a count of a fewer number of work operations than the immediately preceding time period, the shaft 100 will move the lever 66 very rapidly to a position adjacent the shoulder 72 and this will result in a substantially horizontal line on the graph 122 extending in a direction toward the zero reference point thereon. In any time period wherein a greater number of work operations is counted than in the immediately previous time period the shoulder 72 will engage the lever 66 prior to the end of the time period and move the marking pen in a direction away from the zero reference point on the chart 120. The trace 122 indicated in FIGURE 6 is an illustrative example of a graph which might be the result of such a counting operation recording. It will be apparent that lengthy transversely extending lines between each reference position indicating a particualr counting are eliminated and a single trace is provided, which may be step wise, as shown herein, provided that the number of work operations through successive time periods varies. The single trace 122 thus defined greatly facilitates the utilization or calculation of the recorded data.

*Modified recording apparatus*

Figure 8:
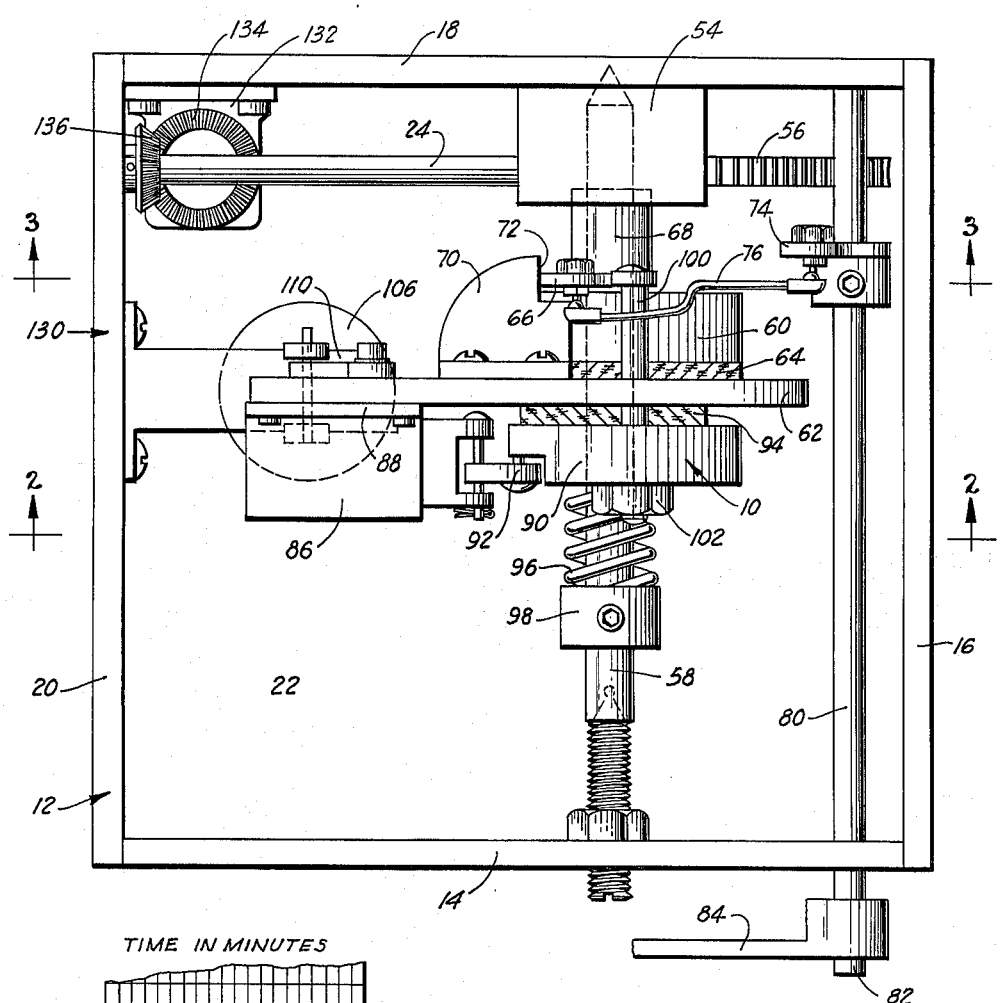
FIGURE 8 is a view similar to FIGURE 1 depicting a modified form of the invention.
Figure 9:
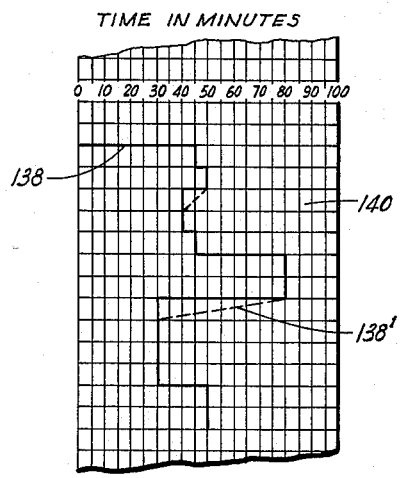
FIGURE 9 is a view similar to FIGURE 6 showing a chart produced by the modified embodiment of the invention.

Referring now to FIGURES 8, 9 and 10, the recording apparatus 130 is generally similar to the device 10 set forth in the first embodiment and includes the shaft 24 having the worm 52 provided at one end thereof for driving or transmitting rotation to the worm gear 56. The carrier plate 62 is rotated simultaneously with the worm gear 56, as hereinbefore set forth, for moving the shoulder 72 in order to move the recording stylus for producing a trace 138 on a chart 140. However, in the embodiment depicted in FIGURE 8, the pawl 32 and ratchet 26 and attendant elements are eliminated. In addition, a suitable constant speed device, such as a motor 132, or the like, is secured to the side plate 18 in lieu of the solenoid 44 and is operably connected with the shaft 24 in any well known manner to provide for constant rotation thereof. As depicted herein, rotation is transmitted from the motor 132 to the shaft 24 through cooperating bevel gears 134 and 136, but is not limited thereto.

The trace 138 produced by the modified recorder apparatus 130 is generally similar in appearance to the trace 122 provided by the first embodiment, but in the second instance the ordinate and abscissa have been effectively reversed from that in the first instance. Whereas in the first illustration as shown in FIGURE 6, the abscissa is indicated as relating to the counted number of work operations and the ordinate indicates a dimensional function, such as elapsed time; in the second embodiment, the abscissa indicates elapsed time, or other dimensional functions, and the ordinate designates events occurrences.

During the operation of the recording apparatus 130, the shaft 24 rotates continually upon actuation of the motor 132 wherein the carrier plate 62 is rotated at a constant rate of speed. This causes the shoulder 72 to move constantly in a direction toward the lever 66 for engagement therewith. Of course, upon the initial actuation o fthe recording device 130, the lever 66 is normally in a position adjacent the shoulder 72 and thus a constant movement is imparted to the recording stylus for moving the stylus horizontally across the chart or sheet 138. The chart 140 is stationary during this horizontal or crosswise movement of the recording stylus, which results in the production of a horizontally extending line on the chart 140. Upon the occurrence of a work operation or an event, such as upon the completion of a foot in a well bore drilling operation, the solenoid 86 is actuated for assuring engagement of the lever 66 with the shoulder 72, and simultaneously with or immediately subsequent to the actuation of the solenoid 86, the chart 140 is advanced through a distance corresponding to the work occurrence in accordance with the preselected scale for the chart. If the chart 140 is advanced simultaneously with the actuation of the solenoid 86 the resultant inscribed line may be at a slight angle from the horizontal, as will be hereinafter set forth, whereas a vertical line will be produced if the chart is advanced immediately subsequent to the actuation of the solenoid 86. Subsequent to the actuation of the solenoid 86 and advancing of the chart 140, the solenoid 106 is actuated for returning the carrier plate 62 to the initial or reference position. As hereinbefore set forth in the operation of the first embodiment, the recording pen remains undisturbed on the chart 140 during the resetting of the carriage plate 62.

During the next succeeding time interval required for the completion of the work operation, such as for the drilling of the next foot of the well bore, the constant rotation of the carrier plate 62 by the gear system is continued. The carrier plate 62 moves from the initial or reset position for moving the shoulder 72 in a direction toward the lever 66. In the event that a greater time lapse occurs for the drilling of the second foot, the shoulder 72 will engage the lever 66 for moving the pen through an additional horizontal distance in the same direction as during the preceding time interval. At the occurrence of the work operation, the chart 140 is again advanced and the solenoids 86 and 106 actuated in the sequence as hereinbefore set forth. In the event that a lesser time period is required for the drilling of the next succeeding foot of well bore, the shoulder 72 will not be moved through a sufficient distance to contact the lever 66. In this circumstance, the actuation of the solenoid 86 will move the lever 66 into a position against the shoulder 72, which will result in a horizontal line extending in a reverse direction from the previously inscribed horizontal line. As hereinbefore set forth, the reverse horizontal line may be at a slight downward inclination if the chart is advanced simultaneously with the actuation of the solenoid 86. The trace 138 shown in FIGURE 9 is illustrative of the type of recording which may be produced during such an operation. The trace 138 shown in solid lines is the type which may be produced if the chart is advanced subsequent to actuation of the solenoid if the chart is advanced subsequent to actuation of the solenoid 86. The trace 138' shown in dotted lines illustrates a curve which may result upon simultaneous advancing of the chart and actuation of the solenoid 86.

It will be apparent that suitable stop means or limiting switch means, or the like (not shown), may be provided for limiting the horizontal movement of the recording pen in one direction for precluding movement of the pen through a sufficient distance to move off the chart 140. This may be necessary in circumstances wherein extreme periods of time elapse between event occurrences, such as when a drilling rig is shut down for some reason. Of course, this may be accomplished in many ways, such as by a disengagement of the gears 134 and 136, or an interruption of current supply to the motor 132, or the like.

In the second embodiment of the invention the counter device 114 may indicate elapsed time between two successive events occurrences, or shown, minutes per foot. The cumulative counter 116 may be utilized for maintaining a visual record of the total elapsed time during the accumulated number of events occurrences throughout the entire period of operation of the recorder apparatus 130. FIGURE 10 illustrates such a modification wherein the motor or constant speed device 132 provides power for actuation of the gear system, and a suitable switch 142 is energized or actuated upon the occurrence of a work operation for actuation of the solenoids 86 and 106 and for the advancing of the chart 140. The switch 142 may be operably connected with the solenoid 106 through a suitable time delay relay 144, or the like, whereby actuation of the solenoid 106 is delayed slightly with respect to the actuation of the solenoid 86. The switch 142 may be energized upon an events occurrence for actuating the solenoid 86, and transmitting a delayed energization to the solenoid 106, and the counter device 114 is reset to a zero or initial reading simultaneously with the resetting of the indexing means or plate 62.

From the foregoing, it will be apparent that the present invention provides a novel combined counting and recording apparatus wherein a single continuation trace is provided on a data recording sheet for greatly facilitating the interpretation of recorded data. The indexing means functions for positioning the lever means in accordance with a dimensional function and may be reset to a reference point independently of the lever means whereby the trace produced is a single continuous line. Thus, the novel apparatus counts and records a function or work operation as related to known information, such as time intervals, distance intervals, or the like, in a manner wherein a zig-zag pattern on the resulting graph is eliminated and the resulting recorded data may be more readily and accurately ascertained from the trace. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. A recording apparatus comprising counting means actuated upon each occurrence of a function for counting the number of said functions, lever means for transferring a trace on a record data sheet, indexing means operable by said counting means for establishing the position of the lever means in accordance with the number of functions occurring within a preselected dimensional interval, extension means mounted on said indexing means and movable relative to said indexing means, means responsive to the completion of each dimensional interval for moving said extension means relative to said indexing means for urging said lever means against said indexing means, and reset means operable after the actuation of said means for moving said extension means for intermittently moving the indexing means to a reference position independently of said lever means whereby the resultant trace is a single continuous line.

2. A recording apparatus comprising ratchet means operable upon each occurrence of a work operation, gear means actuated by said ratchet means, indexing means operable by said gear means for determination of a reference position in accordance with the number of work operations, occurring during a preselected interval, a shoulder mounted on said means, a movable extension mounted on said indexing means, lever means movable to said reference position by said indexing means to provide a trace on a record data sheet, means responsive to the completion of each interval for moving said extension relative to said indexing means for urging said lever means against said shoulder, and reset means intermittently actuated after each preselected interval for moving the indexing means to an initial position independently of said lever means whereby the recorded trace is a continuous single line.

3. Operating means for a recording apparatus comprising a frame, a lever mounted for pivotal movement about an axis within said frame, said lever being connected to a recording means for recording successive incremental values of a given variable at the end of successive measured intervals, indexing means movable from an initial reference position at the beginning of each measuring interval towards said lever and to a second variable position a tthe end of each measuring interval, said variable position being spaced away from said reference position by a distance commensurate with the incremental value of the measured variable during said measuring interval, an extension means mounted on said indexing means and movable relative thereto for urging said lever against said indexing means for establishing the position of said lever at said second variable position at the end of said measuring interval, and means for returning said index means to said initial reference position at the end of each measuring interval independently of said lever.

4. A recording apparatus comprising lever means mounted for pivotal movement about a given axis, means connecting the lever means with recording means to produce a trace on a record data sheet, indexing means mounted for pivotal movement on said given axis, a shoulder mounted on said indexing means and disposed in the path of movement of said lever means, positioning means movably mounted on said indexing means and extending into the path of movement of said lever means on a side of said lever means opposite from said shoulder, means for pivoting said indexing means from an initial position towards said lever means, means responsive to the completion of a given dimensional function for moving said positioning means relative to said indexing means so as to urge said lever means against said shoulder, and reset means actuated subsequent to the operation of the means for moving said positioning means for pivoting said indexing means back to its initial position.

5. A combined counting and recording apparatus comprising switch means intermittently energized upon each occurrence of a function, pawl and ratchet means actuated upon the energization of the said switch means in response to a counting of the number of occurrences of said function, a movable indexing means, gear means actuated by said pawl and ratchet means for transmitting motion to said indexing means, positioning means mounting on said indexing means and movable therewith to an indexing position in accordane with the counted number of occurrences of said function, lever means for transferring a trace on a record data sheet, extension means movably mounted on said indexing means and intermittently movable relative to said indexing means for engaging said lever means with said positioning means whereby the trace produced by said lever means reflects the number of occurrences of said function during a preselected dimensional interval, and reset means intermittently operable subsequent to the actuation of the extension means for moving the indexing means to a reference position independently of the lever means whereby the trace produced is a single continuous line on the record data sheet.

6. A combined counting and recording apparatus comprising ratchet and pawl means operable upon each occurrence of a work operation for continuously responding to a counting of the occurrences of the work operation, a movable plate means, gear means operable by said ratchet and pawl means for transmitting movement to said movable plate means, bracket means carried by the movable plate means and movable therewith for establishing a reference position in accordance with the number of occurrences of the work operation, means for providing a trace on a record data sheet, extension means carried by the movable plate means and intermittently operable independently thereof for engaging the recording means with the bracket means at preselected dimensional intervals, and reset means intermittently operable for resetting the indexing means to an initial position independently of the recording means whereby the produced trace is a single continuous line on the record data sheet.

7. A combined counting and recording apparatus comprising housing means, a first shaft journaled in said housing means, pawl and ratchet means provided on one end of said shaft and operable upon each occurrence of a work operation in response to counting of the work operations and for transmitting intermittent rotation to the shaft, worm gear means provided on the opposite end of said shaft and rotatable therewith for transmitting movement to a second shaft, said second shaft being journaled in said housing means at substantially right angles to said first shaft, carriage plate means loosely arranged on said second shaft, means for transmitting rotation from said worm gear means to said carriage plate means to provide for movement of the carriage plate means during the counting of the work operations, first lever means loosely arranged on said second shaft and interposed between the worm gear means and the carriage plate means, means carried by the carriage plate means for positioning the first lever means in accordance with the counted number of work operations occurring during preselected time intervals, second lever means connecting the first lever means with recording means to produce a trace on a record data sheet, and reset means intermittently operable for moving said carriage plate means to a reference position independently of the first and second lever means whereby the trace produced is a single continuous line.

8. A recording apparatus as set forth in claim 7 wherein the means carried by the carriage plate means for positioning the first lever means includes first positioning means movable simultaneously with the carriage plate to establish a reference position in accordance with the counted number of work occurrences, and second positioning means operable at the said preselected time intervals for engaging the lever means with the first positioning means to produce an indication on the trace corresponding to the counted number of work operations during said time intervals.

9. A combined counting and recording apparatus comprising housing means, a first shaft journaled in said housing means, ratchet and pawl means provided on one end of the first shaft and operable upon each occurrence of a work operation for rotating the first shaft through a preselected angle in accordance with a counting of the work operations, worm gear means carried by the opposite end of said shaft for transmitting the rotation of said first shaft to a second shaft, said second shaft journaled in said housing means at substantially right angles to said first shaft, carriage plate means loosely arranged on said second shaft, friction means for transmitting rotation between the said second shaft and the carriage plate means, lever means loosely journaled on said second shaft and interposed between said friction means and said worm gear means, said lever means arranged for transcribing a trace on a record data sheet, bracket means carried by said carriage plate means and extending outwardly therefrom in a direction toward said lever means, a shoulder provided on said bracket means for establishing a reference position upon movement of the carriage plate means, movable lever arm means loosely disposed on said second shaft, a shaft member provided on the movable lever and extending through the carriage plate in a direction toward the lever means, said movable lever intermittently operable for engaging the said lever means with the shoulder whereby an indication is provided on the trace in accordance with the counted number of work occurrences during the intermittent interval, and reset means connected with the carriage plate means and intermittently operable for resetting the carriage plate means to an initial reference position independently from the lever means whereby the trace produced is a single continuous line.

10. A recording apparatus comprising housing means, a first shaft journaled in said housing means, constant speed means for transmitting rotation to the shaft, worm gear means provided on one end of the shaft and actuated thereby for transmitting rotation to a second shaft, said second shaft being journaled in said housing means at substantially right angles to said first shaft, carriage plate means loosely arranged on said second shaft, means for transmitting rotation from said worm gear means to said carriage plate means to provide for movement of the carriage plate means in one direction, first lever means loosely arranged on said second shaft and interposed between the worm gear means and the carriage plate means, means carried by the carriage plate means for positioning the first lever means in accordance with events occurrences during a corresponding time interval, second lever means connecting the first lever means with recording means to produce a trace on a record data sheet, and reset means intermittently operable for moving said carriage plate means to a reference position independently of the first and second lever means whereby the trace produced is a single continuous line.

11. A recording apparatus comprising housing means, a first shaft journaled in said housing means, constant speed means operably connected with the said shaft for transmitting rotation thereto, worm gear means carried by the shaft for transmitting rotation from the first shaft to a second shaft, said second shaft journaled in said housing means at substantially right angles to said first shaft, carriage plate means loosely arranged on said second shaft, friction means for transmitting rotation between the said second shaft and the carriage plate means, lever means loosely journaled on said second shaft and interposed between said friction means and said worm gear means, said lever means arranged for transcribing a trace on a record data sheet, bracket means carried by said carriage plate means and extending outwardly therefrom in a direction toward said lever means, a shoulder provided on said bracket means for establishing a reference position upon movement of the carriage plate means, movable lever arm means loosely disposed on said second shaft, a shaft member provided on the movable lever and extending through the carriage plate in a direction toward the lever means, said movable lever intermittently operable for engaging the said lever means with the shoulder whereby an indication is provided on the trace in accordance with an events occurrence as correlated with an elapsed time period, and reset means connected with the carriage plate means and intermittently operable for resetting the carriage plate means to an initial reference position independently from the lever means whereby the trace produced is a single continuous line.

12. A recording apparatus comprising a constant speed power source, gear means operable by said constant speed power source for transmitting movement to a movable plate means, bracket means carried by the movable plate and movable therewith for establishing a reference position in accordance with a dimensional function, lever means for providing a trace on a record data sheet, extension means carried by the movable plate means and intermittently movable with respect to said movable plate so as to urge said lever means against the bracket means at preselected intervals, and reset means intermittently operable for resetting the movable plate means to an initial position independently of the recording means whereby the produced trace is a single continuous line on the record data sheet.

References Cited by the Examiner
UNITED STATES PATENTS

| | | | |
|---|---|---|---|
| 960,568 | 6/10 | Mitchell | 346—114 X |
| 1,133,455 | 3/15 | Bard | 346—30 |
| 2,444,327 | 6/48 | Baldwin. | |
| 2,519,925 | 8/50 | Okuniew | 346—17 |
| 2,600,336 | 6/52 | Scivally. | |
| 2,679,161 | 5/54 | Yancey. | |
| 2,831,347 | 4/58 | Yancey. | |
| 2,883,256 | 4/59 | Nichols. | |
| 3,005,525 | 10/61 | Phillips | 346—33 X |
| 3,009,355 | 11/61 | Abs et al. | 346—33 X |
| 3,076,966 | 2/63 | Suter | 346—33 |

LEO SMILOW, *Primary Examiner.*

LEYLAND M. MARTIN, *Examiner.*